(12) United States Patent
Ignatchenko et al.

(10) Patent No.: US 10,280,902 B2
(45) Date of Patent: *May 7, 2019

(54) SYSTEMS, METHODS AND APPARATUSES FOR HARVESTING POWER GENERATED IN FOOTWEAR

(71) Applicant: OLogN Technologies AG, Triesen/FL (LI)

(72) Inventors: Georgii Ignatchenko, Vienna (AT); Sergey Ignatchenko, Innsbruck (AT)

(73) Assignee: OLogN Technologies AG, Triesen/FL (LI)

( * ) Notice: Subject to any disclaimer, the term of this patent is extended or adjusted under 35 U.S.C. 154(b) by 303 days.

This patent is subject to a terminal disclaimer.

(21) Appl. No.: 15/171,586

(22) Filed: Jun. 2, 2016

(65) Prior Publication Data
US 2016/0273522 A1    Sep. 22, 2016

Related U.S. Application Data

(63) Continuation of application No. 14/198,081, filed on Mar. 5, 2014, now Pat. No. 9,359,992.
(Continued)

(51) Int. Cl.
*A43B 13/18* (2006.01)
*A43B 13/20* (2006.01)
(Continued)

(52) U.S. Cl.
CPC .............. *F03G 5/06* (2013.01); *A43B 3/0015* (2013.01); *A43B 13/189* (2013.01);
(Continued)

(58) Field of Classification Search
CPC ... A43B 3/0015; A43B 13/189; A43B 13/203; A43B 13/06; F16H 43/00; F03B 13/06
(Continued)

(56) References Cited

U.S. PATENT DOCUMENTS 5,495,682 A    3/1996    Chen
6,201,314 B1   3/2001    Landry
(Continued)

FOREIGN PATENT DOCUMENTS

WO   WO 2009/048438    4/2009

OTHER PUBLICATIONS

Anonymous, "Charging Batteries Could Soon Be a Walk in the Park," Vancouver Sun, Retrieved from the Internet at: http://www.canada.com/story.html?id=b2dbc7cb-f89e-4be1-8e30-1c67b6e1ad94 (2008).
(Continued)

*Primary Examiner* — Nathaniel E Wiehe
*Assistant Examiner* — Daniel S Collins
(74) *Attorney, Agent, or Firm* — Arnold & Porter Kaye Scholer LLP

(57) ABSTRACT

The systems, methods and apparatuses described herein provide a footwear hydraulic system for harvesting power generated by pressing a foot on a surface and providing a cushion for the impact. In certain aspects, a hydraulic system for a footwear may comprise at least one chamber with a first and second compartments separated by an elastic membrane. The first compartment may be filled with gas and the second compartment may be filled with liquid. The gas may provide impact cushion and transient energy storage, and the liquid may pressured to push a generator to produce energy. The pressure may be generated by pressing the footwear on a surface and/or the elastic membrane of the chamber trying to restore its shape.

16 Claims, 12 Drawing Sheets

Related U.S. Application Data

(60) Provisional application No. 61/774,947, filed on Mar. 8, 2013.

(51) Int. Cl.
    *F03G 5/06*     (2006.01)
    *F03B 17/00*     (2006.01)
    *F03G 7/08*     (2006.01)
    *A43B 3/00*     (2006.01)

(52) U.S. Cl.
    CPC .......... *A43B 13/203* (2013.01); *F03B 17/005* (2013.01); *F03G 7/08* (2013.01)

(58) Field of Classification Search
    USPC ................................ 60/698, 486, 398; 92/92
    See application file for complete search history.

(56) References Cited

U.S. PATENT DOCUMENTS

| | | |
|---|---|---|
| 7,956,476 B2 | 6/2011 | Yang |
| 8,013,463 B2 | 9/2011 | Preston |
| 8,872,362 B2 | 10/2014 | Lee et al. |
| 9,359,992 B2* | 6/2016 | Ignatchenko ......... F03B 17/005 |
| 2005/0055846 A1 | 3/2005 | Caldwell |
| 2007/0145746 A1 | 6/2007 | Biamonte |
| 2008/0127510 A1 | 6/2008 | Yang |
| 2010/0223813 A1* | 9/2010 | Ozturk ..................... A43B 3/00 36/105 |
| 2010/0223818 A1 | 9/2010 | Hampton |

OTHER PUBLICATIONS

Fourie, "Shoe-Mounted PVDF Piezoelectric Transducer for Energy Harvesting," conducted during an REU Program at Texas A&M University (2009).

Hayashida, "Unobtrusive Integration of Magnetic Generator Systems into Common Footwear," Massachusetts Institute of Technology (2000).

Kendall, "Parasitic Power Collection in Shoe Mounted Devices," Submitted to the Department of Physics at the Massachusetts Institute of Technology (1998).

Kymissis et al., "Parasitic Power Harvesting in Shoes," $2^{nd}$ IEEE International Conference on Wearable Computing (1998).

Shenck et al., "Unobtrusive Energy Scavenging Using Shoe-Mounted Piezoelectrics and Simple Power-Conditioning Electronics," Responsive Environments Group, MIT Media Laboratory, created on or about Dec. 1999.

Starner et al.,"Human Generated Power for Mobile Electronics," in Low Power Electronics Design, CRC Press: Boca Raton (2004).

International Search Report and Written Opinion for International Patent Application No. PCT/IB2014/059495, dated Apr. 24, 2014.

Extended European Search Report dated Feb. 18, 2018 in European Patent Application No. 17001731.3.

\* cited by examiner

FIG. 12B SECTION A-A

FIG. 12C SECTION B-B

SYSTEMS, METHODS AND APPARATUSES FOR HARVESTING POWER GENERATED IN FOOTWEAR

RELATED APPLICATIONS

This application is a continuation of U.S. application Ser. No. 14/198,081 filed Mar. 5, 2014, which claims priority to U.S. Provisional Application No. 61/774,947, filed Mar. 8, 2013, entitled "Systems, Methods and Apparatuses for Harvesting Power Generated in a Footwear," the contents of these applications are incorporated herein by reference in its their entireties.

FIELD OF THE DISCLOSURE

The systems, methods and apparatuses described herein relate to harvesting power generated in a footwear, in particular, power generated by a foot wearing the footwear pressing on a surface (such as the ground).

BACKGROUND

Scientists estimate that as much as 67 watts of power is available in the foot movement of an average (68 kg) person walking at a brisk pace (two steps per second with the foot moving 5 cm vertically). Although there have been efforts to harvest this power, these efforts have failed to meet the demand for: low weight, low cost, relatively high power output and convenient power delivery, reliability, or unobtrusive "parasitic" action. Therefore, there is a need in the art for harvesting the power generated in a footwear efficiently and with comfortable cushion.

BRIEF DESCRIPTION OF THE DRAWINGS

FIG. 12B is a cross sectional view of an exemplary hydraulic system for a footwear according to the present disclosure.

FIG. 12C is another cross sectional view of an exemplary hydraulic system for a footwear according to the present disclosure.

DETAILED DESCRIPTION

Figure 1:
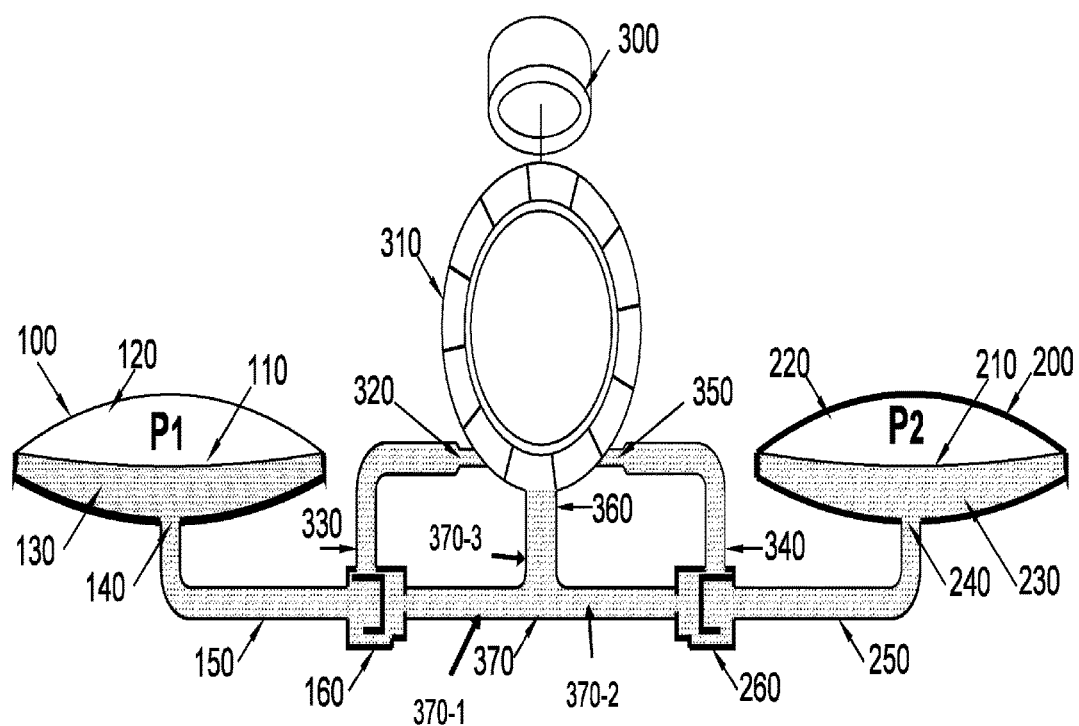
FIG. 1 is a block diagram of an exemplary hydraulic system for a footwear according to the present disclosure.

Certain illustrative aspects of the systems, apparatuses, and methods according to the present invention are described herein in connection with the following description and the accompanying figures. These aspects are indicative, however, of but a few of the various ways in which the principles of the invention may be employed and the present invention is intended to include all such aspects and their equivalents. Other advantages and novel features of the invention may become apparent from the following detailed description when considered in conjunction with the figures.

In the following detailed description, numerous specific details are set forth in order to provide a thorough understanding of the invention. In other instances, well known structures, and processes have not been shown in detail in order not to unnecessarily obscure the invention. However, it will be apparent to one of ordinary skill in the art that those specific details disclosed herein need not be used to practice the invention and do not represent a limitation on the scope of the invention, except as recited in the claims. It is intended that no part of this specification be construed to effect a disavowal of any part of the full scope of the invention. Although certain embodiments of the present disclosure are described, these embodiments likewise are not intended to limit the full scope of the invention.

The present disclosure provides systems, methods and apparatuses for harvesting power generated by pressing a foot on a surface and providing a cushion for the impact. In certain aspects, a hydraulic system for a footwear may comprise at least one chamber with a first and second compartments separated by an elastic membrane. The first compartment may be filled with gas and the second compartment may be filled with liquid. The elastic membrane may be pre-stressed to pressure the gas and liquid. The gas may provide impact cushion and transient energy storage, and the liquid may push a generator to produce energy. The pressure may be generated by a foot pressing on a surface and/or the elastic membrane of the chamber trying to restore its shape. In one embodiment, the gas may be pre-pressurized to improve cushioning.

In other aspects, a hydraulic system for footwear may comprise a first chamber and a second chamber, a turbine and a generator. The first chamber may have an elastic cover that may deform under pressure. The first and second chambers may each have an elastic membrane dividing the respective chamber into two compartments. The two compartments may be filled with gas and liquid respectively. The liquid-filled compartments may be fluidly coupled by passages and valves, and fluidly coupled to the turbine.

In yet other aspects, a hydraulic system for a footwear may comprise three chambers, a turbine and a generator. A first and second chambers of the three chambers may have elastic covers that may deform. A third chamber of the three chambers may have an elastic membrane that divides the third chamber into two compartments filled with gas and liquid, respectively. The liquid-filled compartment of the third chamber may be fluidly coupled to the first and second chambers and the turbine via passages and valves.

Without being limiting, FIG. 1 shows a hydraulic system 1000 for a footwear according to an embodiment of the present disclosure. The hydraulic system 1000 may comprise a first chamber 100 and a second chamber 200, a turbine 310 and a generator 300. The first chamber 100 may be a variable volume chamber that has an elastic cover. The elastic cover may change its shape under pressure and thus, change the volume of the first chamber 100. The second chamber 200 may be a constant volume chamber for energy storage and may not change its volume even under pressure. The first chamber 100 may include a flexible membrane 110 that divides the first chamber 100 into two compartments 120 and 130. The second chamber 200 may include a flexible membrane 210 that divides the second chamber 200 into two compartments 220 and 230. Each of the compartments 120 and 220 may be isolated and sealed, and may be filled with any kind of gas (e.g., air, inert gas, etc.), which may be the same or different. The compartments 130 and 230 may be filled with a fluid (e.g., oil, water, liquid gel, etc.). In some embodiments, the elastic cover of the first chamber 100 may be an elastic convex cover but that is not required for all embodiments. Turbine 310 may be implemented as any kind of device that converts either kinetic energy of the fluid, or potential energy of fluid (due to difference in fluid pressure), or any combination of them, to mechanical rotational energy.

The hydraulic system 1000 may further comprise passages 150, 250, 330, 340, 3-way valves 160 and 260, and a T-connector 370. The chamber 100 may have a port 140 coupled to the passage 150. The chamber 200 may have a port 240 coupled to the passage 250. Each 3-way valves 160 and 260 may have three ports, respectively. The T-connector 370 may also have three ports: 370-1, 370-2 and 370-3. The three ports of the 3-way valve 160 may be coupled to the passages 150, 330 and the port 370-1 of the T-connector 370, respectively. The three ports of the 3-way valve 260 may be coupled to the passage 250, 340 and the port 370-2 of the T-connector 370, respectively. The port 370-3 of the T-connector 370 may be coupled to a port 360 of the turbine 310. The passage 330 may have a first end coupled to the 3-way valve 160 and a second end coupled to the turbine 310 via a nozzle 320. The passage 340 may have a first end coupled to the 3-way valve 260 and a second end coupled to the turbine 310 via a nozzle 350. The generator 300 may be mechanically coupled to the turbine 310 (e.g., via one or more gears, or a shaft).

When the hydraulic system 1000 is in equilibrium, the pressure P1 in the first chamber 100 may be equal to the pressure P2 in the second chamber 200. The 3-way valves 160 and 260 may be in neutral positions and the fluid in the hydraulic compartments (e.g., 130, 230) may be motionless.

The hydraulic systems according to the present disclosure may be placed in a footwear, such as the sole of a shoe, to harvest power generated by a foot wearing the footwear pressing on a surface during body movement. For example, during walking, the foot may have a stance phase, during which the foot may be on the ground, and a swing phase, during which the foot may be off the ground. The stance phase (foot on the ground) may be divided into four stages (or sub-phases): Heel Strike (HS), Flatfoot (FF), Heel Rise (HR), and Toe Off (TO). The hydraulic systems according to the present disclosure may harvest power generated by impacts, e.g., during the heel strike, heel rise, and/or toe off stages.

Figure 2:
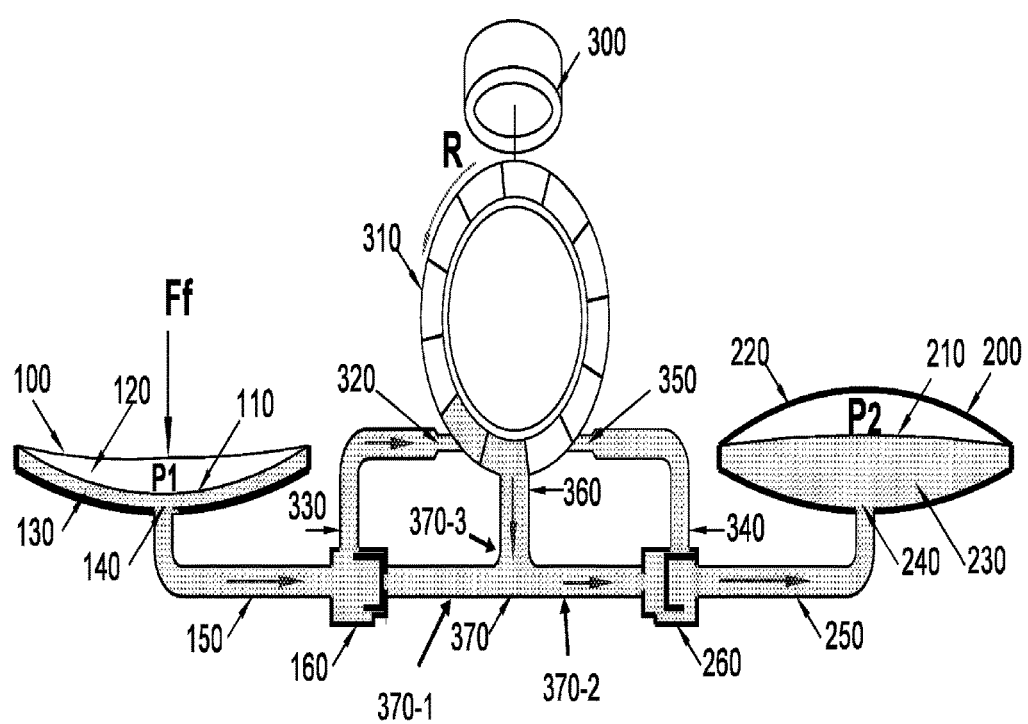
FIG. 2 is a block diagram of the exemplary hydraulic system of FIG. 1 during a heel strike stage according to the present disclosure.

The hydraulic systems according to the present disclosure may combine gas-filled cushioning with harvesting electrical power generated by a turbine from the energy of impact (e.g., the foot striking the ground). In one embodiment, the variable volume chamber 100 may be placed in the heel area of a footwear, and the constant volume chamber 200 may be placed under the foot arch, or in the ball of the foot area or toe area of the footwear. In another embodiment, the chambers 100 and 200 may be stacked together in the heel area of a footwear. In either embodiment, the generator 300 and the turbine 310 may be placed under the foot arch in the shoe sole, or in any other convenient place. The generator 300 may be coin-shaped to fit in the small place under the foot arch. Further, in both embodiments, because the chamber 100 is in the heel area of the shoe sole, when the heel of the shoe hits the ground (e.g., during the HS stage), the elastic cover of the first chamber 100 may begin to collapse under the force of the heel striking the ground and the weight of the person, hence the pressure of the fluid in the compartment 120 may increase and push the fluid in the compartment 130 out of the chamber 100. FIG. 2 is another block diagram of the exemplary hydraulic system 1000 illustrating this situation.

As shown in FIG. 2, the first chamber 100 may be deformed by a force $F_f$. The force $F_f$ may be, for example, a force applied to the elastic cover of the first chamber 100 when the heel strikes the ground. When the first chamber 100 deforms, the pressure P1 in the compartment 120 of the first chamber 100 may increase and the fluid inside the compartment 130 may start to flow out of the chamber 100 through the port 140. As indicated by an arrow inside the passage 150, the fluid from the compartment 130 may flow in a direction that may push close the valve 160's port to the T-connector 370 and leave open the valve 160's port to the passage 330. Thus, as further indicated by an arrow inside the passage 330, the nozzle 320 may cause the fluid to form a collimated stream that flows onto the turbine 310 to rotate the turbine 310. For example, the turbine 310 may rotate counterclockwise as indicated by the arrow R and thus, the generator 300 may be rotated to produce electricity.

After causing the turbine 310 to rotate, the fluid may flow out of the turbine 310 through the port 360 as indicated by an arrow through the port 360. Because the valve 160's port to the T-connector 370 is closed under the pressure P1, the fluid may push the valve 260's port to the T-connector 370 open (from the left to right as shown in FIG. 2) and flow to the compartment 230 of the second chamber 200. The flexible membrane 210 may deform under the pressure of inflowing fluid. Accordingly, the pressure P2 in the compartment 220 may increase. When the pressure in the chambers 100 and 200 equalize, the fluid may stop flowing.

In one embodiment, the cross-section of the nozzle 320 (that define the flow rate through the nozzle) and volume of fluid in the compartment 130 may be chosen so that the time from the beginning of the HS stage (from when the foot strikes the ground) to equilibrium may not be longer than the time duration of the HS stage, when walking at an average rate.

Figure 3:
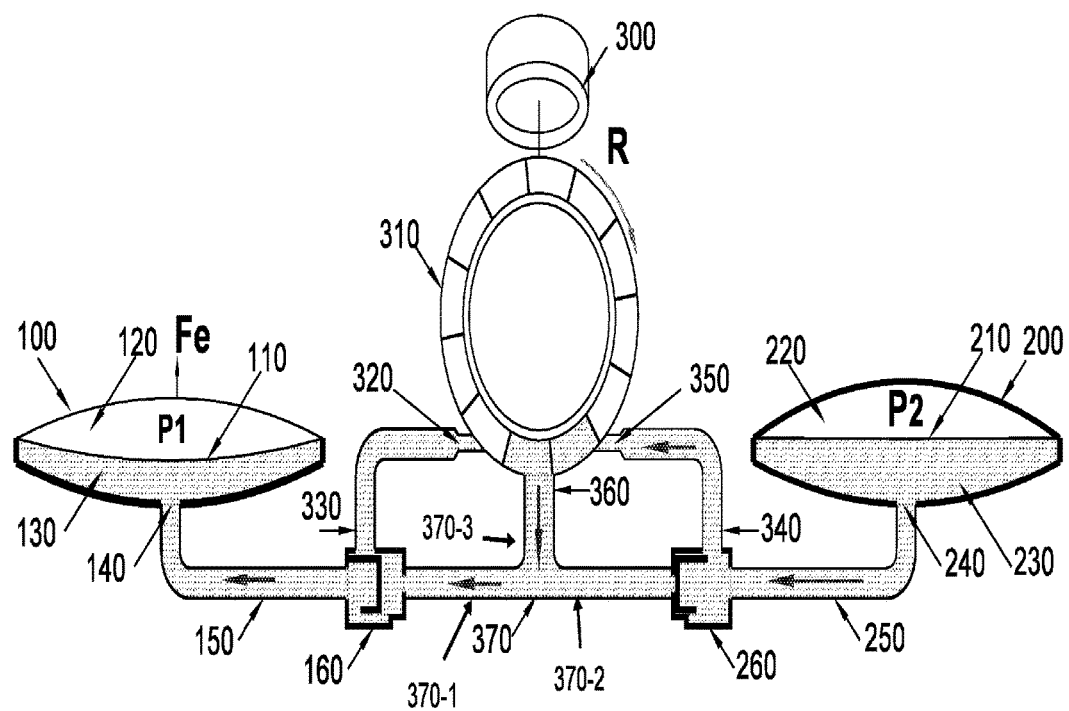
FIG. 3 is a block diagram of the exemplary hydraulic system of FIG. 1 after a heel strike stage according to the present disclosure.

When the force $F_f$ is released, for example, during the swing phase of the foot, the elastic cover of the chamber 100 may try to restore its shape, the pressure P2 in the chamber 200 may become bigger than pressure P1 in the chamber 100. FIG. 3 is another block diagram of the exemplary hydraulic system 1000 illustrating this situation.

As shown in FIG. 3, the elastic cover of the chamber 100 may generate a force illustrated as Fe on the elastic cover itself. The force Fe may act to restore the shape of elastic cover of the chamber 100. At this stage, the volume of the compartment 120 may increase and the pressure P1 may drop, the pressure difference P2-P1 may cause the fluid flow out of the compartment 230 and back to the compartment 130 as indicated by arrows in the passages 150, 250, 340 and the T-connector 370. In this situation, the valve 160 may open the port connecting to the port 370-1 of the T-connector 370 and close the port to the passage 330. The valve 260 may open the port connecting the passage 250 to the passage 340 and close the port connecting to the port 370-2 of the T-connector 370. The fluid may be ejected out of the nozzle 350 and push the turbine 310 to rotate in a clockwise direction (as indicated by the arrow R). The cross-section of the nozzle 350 and volume of fluid in the compartment 230 may be chosen so that the time it takes for the pressure in the chambers 100 and 200 to become equal may not be longer than that of the swing phase, when walking at an average rate.

As described earlier, in one embodiment, the compartments 120 and 220 may be filled with gas and the compartments 130 and 230 may be filled with liquid. This may be advantageous over a hydraulic system using only gas or only liquid. If only gas was used, because the density of gas is typically much smaller than liquid (for example density of air is $\rho=1.2$ kg/m3 and density of water is $\rho=1000$ kg/m3), gas may have to move in a much faster speed than liquid to generate the equivalent amount of kinetic energy that is converted into power by the turbine 310. That is, because the density of the liquid is usually about 1000 times greater than gas, the flow speed of gas may be dramatically faster than a slow moving liquid to generate the same amount of kinetic energy. On the other hand, gas may provide a better cushion than liquid and provide a better absorption of the impact energy because gas is a compressible media. Therefore, the hydraulic systems according to the present disclosure (including the hydraulic system 1000 described above and the hydraulic systems 2000 and 3000 described in detail below) may use at least a two-compartment chamber that fills the two compartments with gas and liquid respectively, and may provide better power harvesting and cushioning than using either gas or liquid alone.

Figure 4:
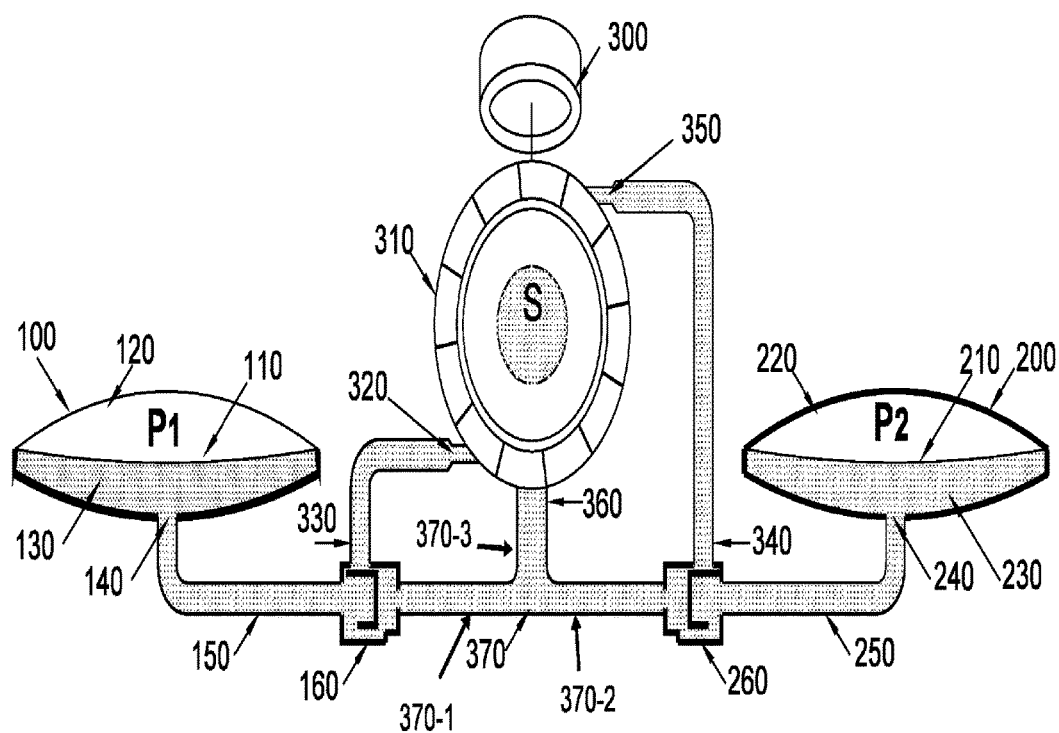
FIG. 4 is a block diagram of another exemplary hydraulic system for a footwear according to the present disclosure.

FIG. 4 is a block diagram of another exemplary hydraulic system 2000 for a footwear according to the present disclosure. The hydraulic system 2000 may differ from the hydraulic system 1000 by a different placement of the nozzles 320 and 350, and a different configuration of the turbine 310. Other components of the hydraulic system 2000 that have the same reference numerals as that of the hydraulic system 1000 may be the same as that of the hydraulic system 1000.

In the hydraulic system 2000, the nozzles 320 and 350 may be placed at opposite sides of the turbine 310 and, the fluid from the nozzles 320 and 350 may push the turbine 310 to rotate in the same direction. Other than their placement, the nozzles 320 and 350 may be the same as their counterparts in the hydraulic system 1000. In one embodiment, the turbine 310 of the hydraulic system 2000 may have its turbine port 360 coupled to the center of the turbine. For example, as shown in FIG. 4, the port 360 may be coupled to a drain S at the center of the turbine 310.

FIG. 4 shows the hydraulic system 2000 in equilibrium, corresponding to the hydraulic system 1000 in FIG. 1. Other than the placement of the nozzles 320 and 350, and configuration of the turbine 310 as described above with respect to FIG. 4, the components of FIG. 4 are the same as their counterparts in FIG. 1.

Figure 5:
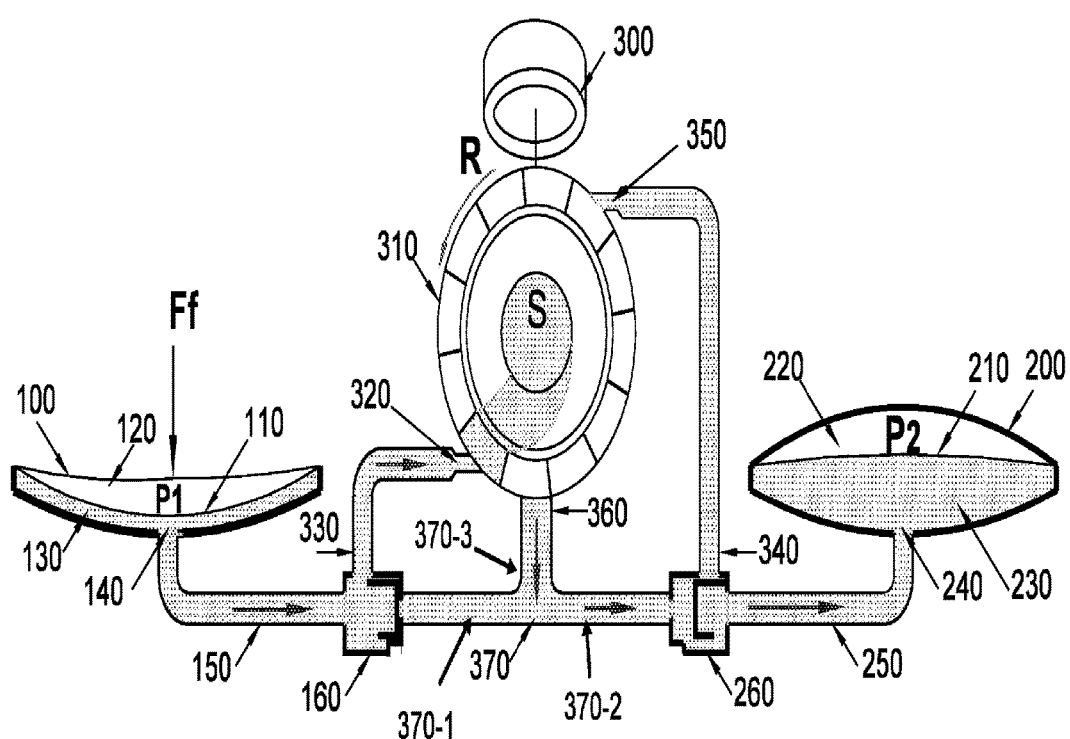
FIG. 5 is a block diagram of the exemplary hydraulic system of FIG. 4 during a heel strike stage according to the present disclosure.

FIG. 5 is another block diagram of the exemplary hydraulic system 2000 illustrating a heel strike stage of the hydraulic system 2000. During the heel strike stage, the chamber 100 may be pressured and the fluid may flow from the compartment 130 of the chamber 100 to the compartment 230 of the chamber 200. In this phase, the hydraulic system 2000 in FIG. 5 may operate in a manner similar to the hydraulic system 1000 shown in FIG. 2 and thus, the detailed description of FIG. 2 may be applicable to FIG. 5.

Figure 6:
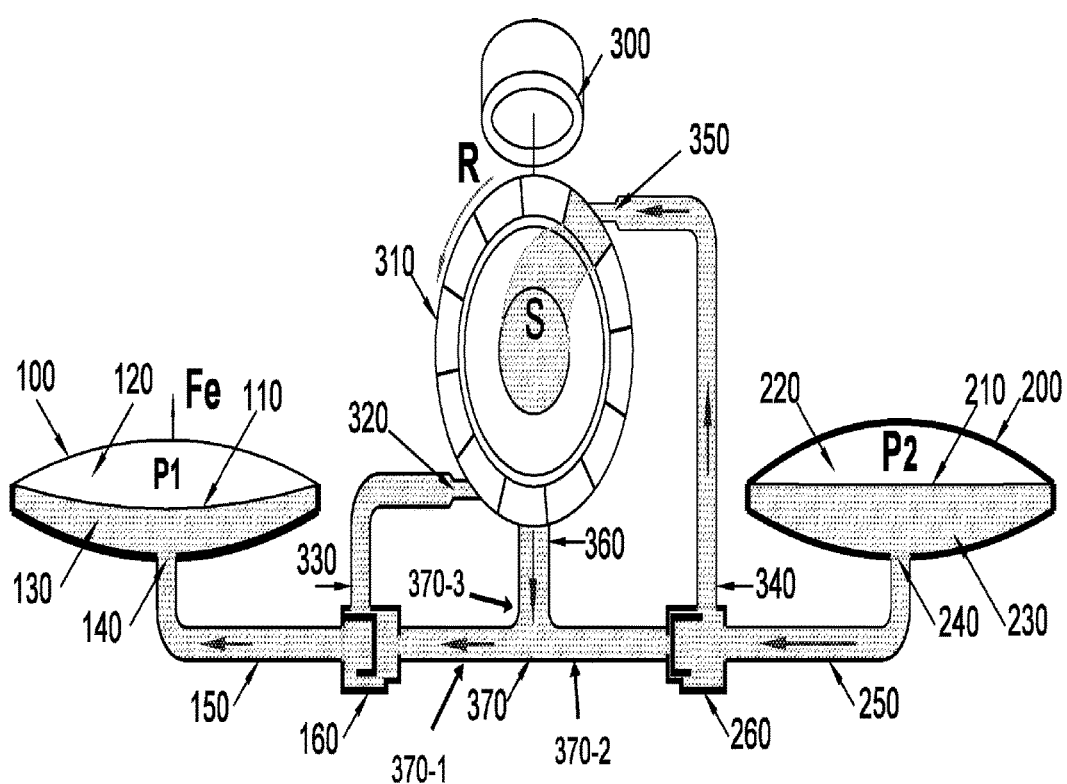
FIG. 6 is another block diagram of the exemplary hydraulic system of FIG. 4 after a heel strike stage according to the present disclosure.

FIG. 6 is another block diagram of the exemplary hydraulic system 2000 illustrating a swing phase of the hydraulic system 2000. During the swing phase, fluid may flow from the compartment 230 of the chamber 200 to the compartment 130 of the chamber 100. In this phase, the hydraulic system 2000 in FIG. 6 may operate in a manner similar to the hydraulic system 1000 shown in FIG. 3 and thus, the detailed description of FIG. 3 may be applicable to FIG. 6 (except that the rotation direction now has the same direction as during a HS stage).

Figure 7:
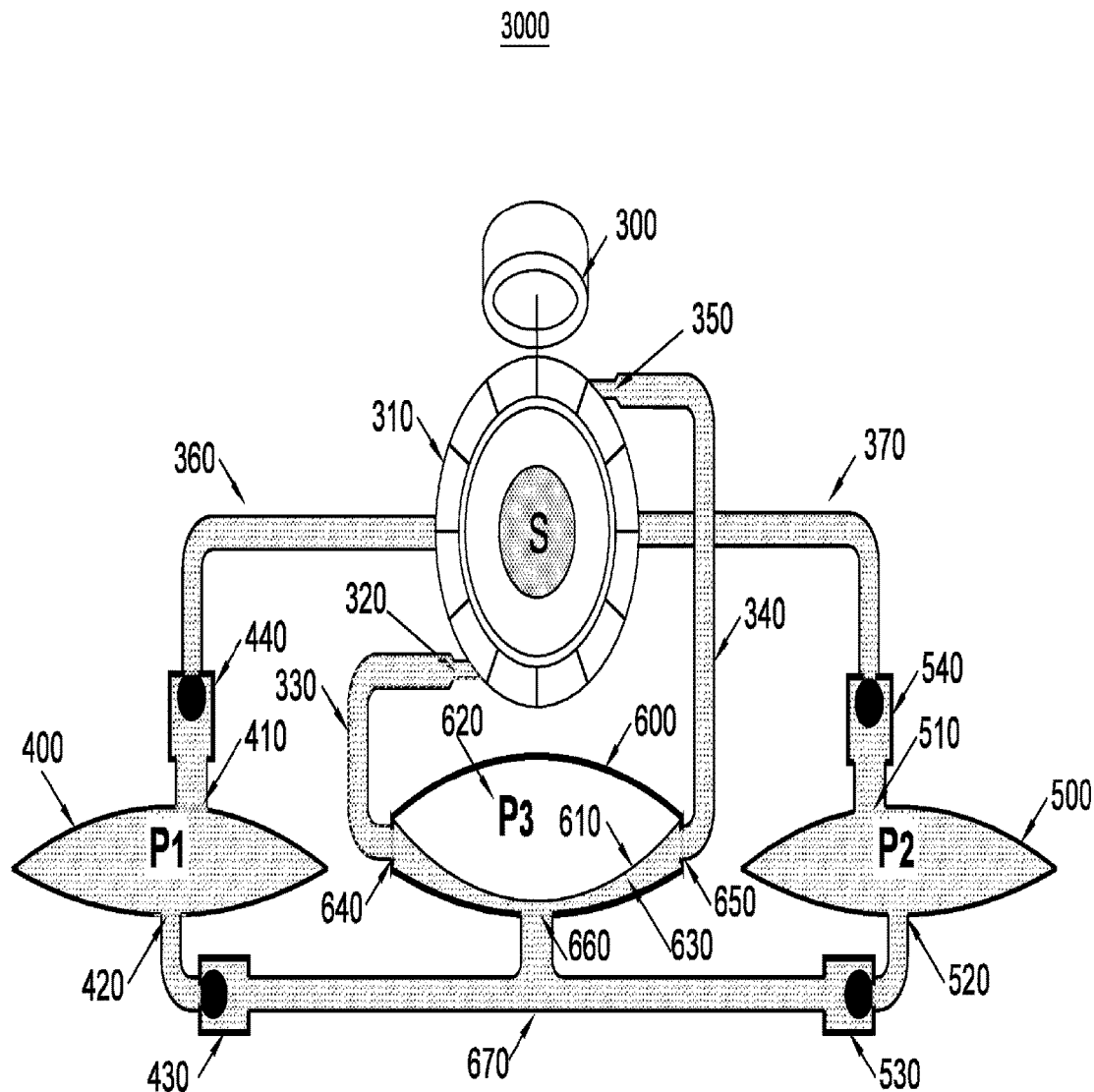
FIG. 7 is a block diagram of another exemplary hydraulic system according to the present disclosure.

FIG. 7 is a block diagram of yet another exemplary hydraulic system 3000 according to the present disclosure. The hydraulic system 3000 may be a three-chamber hydraulic system. Two of the three chambers may have elastic covers that may deform to change their volume. The third chamber of the three chambers may have an elastic membrane that divides the third chamber into two compartments filled with gas and liquid, respectively. The liquid-filled compartment of the third chamber may be fluidly coupled to the first and second chambers and to a turbine. Pressure change in any one of the chambers may cause the liquid to flow and thus, cause a turbine to rotate and a generator coupled to the turbine to generate electricity.

As shown in FIG. 7, the hydraulic system 3000 may comprise a first chamber 400, a second chamber 500, a third chamber 600, a turbine 310 and a generator 300. The first and second chambers 400 and 500 may be variable volume chambers that each has a respective elastic cover. The elastic covers may change their shape respectively under pressure and thus, change the volumes of the first and second chambers 400 and 500 respectively. The third chamber 600 may be a constant volume chamber for energy storage and will not change its volume even under pressure. In addition, the third chamber 600 may include a flexible membrane 610 that divides the third chamber 600 into two compartments 620 and 630. The compartment 620 may be isolated and sealed by the flexible membrane 610 and may be filled with any kind of gas (e.g., air). The compartment 630 and the first and second chambers 400 and 500 may be fluidly coupled together via passages and valves as described in detail below and may be filled with a fluid (e.g., oil, water, liquid gel, etc.). The chamber 600 may form an energy converter that stores impact energy and transfers the impact energy to fluid flow. In some embodiments, either or both elastic covers of the first and second chambers 400 and 500 may be elastic convex covers but that are not required for all embodiments.

The elastic chamber 400 may have an inlet 410 and an outlet 420. The elastic chamber 500 may have an inlet 510 and an outlet 520. In one embodiment, the elastic chamber 400 may be placed in the heel of the shoe sole and the elastic chamber 500 may be placed under ball of the foot in the shoe sole.

The turbine 310 and generator 300 of the hydraulic system 3000 may be similar to their counterparts in the hydraulic system 2000. For example, the turbine 310 of the hydraulic system 3000 may have a central liquid outlet S. The nozzles 320 and 350 of the hydraulic system 3000 may be placed such that they eject fluid onto the turbine 310 to push the turbine 310 rotate in the same direction. The fluid flow may drive the turbine 310 and the generator 300, and generate electrical power just as the hydraulic systems 1000 and 2000. Passages 330 and 340 in the hydraulic system 3000 may couple the nozzles 320 and 350 to outlets 640 and 650 of the compartment 630 of the chamber 600 respectively. The inlet 660 of the compartment 630 may be fluidly coupled through a T-connector 670 to two check-valves 430 and 530. The outlet S of the turbine 310 may be fluidly coupled through the passages 360 and 370 to two check-valves 440 and 540.

In an equilibrium state as shown in FIG. 7, the pressure P1 in the chamber 400 and the pressure P2 in the chamber 500 may be equal to the pressure P3 in the chamber 600, the check-valves 440, 450, 540 and 550 may be closed and the fluid may be motionless.

Figure 8:
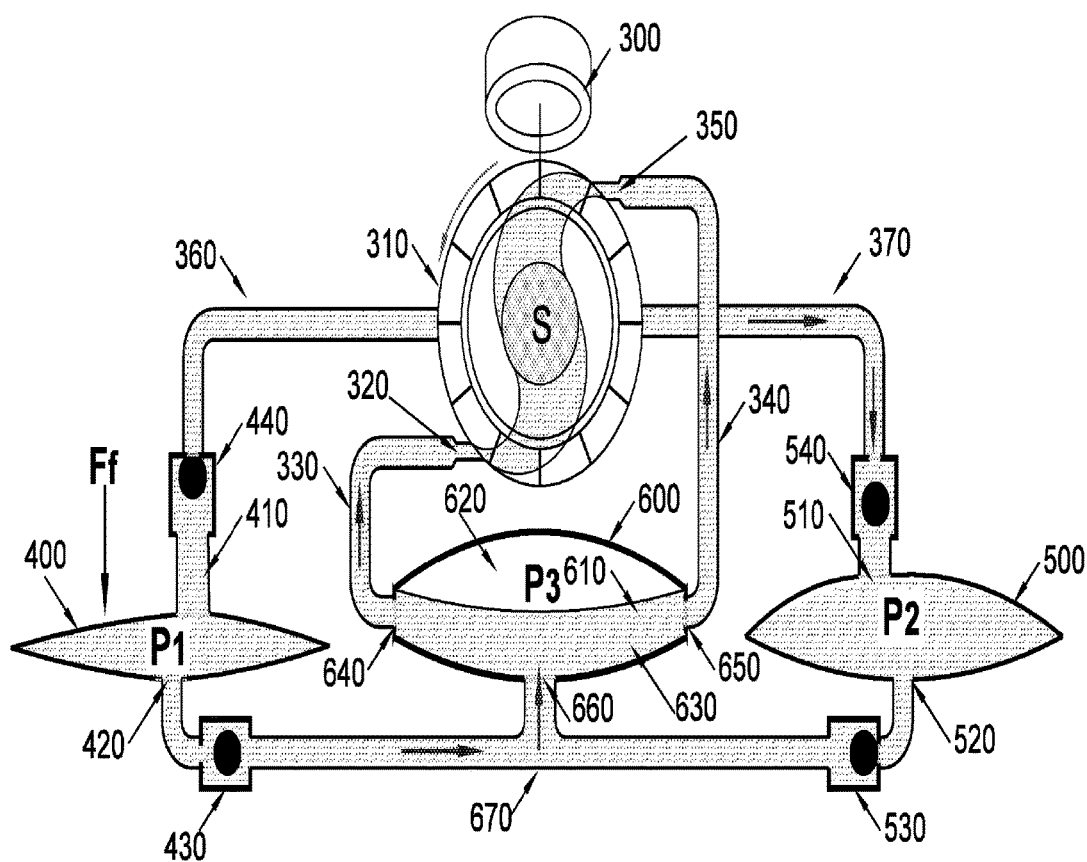
FIG. 8 is another block diagram of the exemplary hydraulic system of FIG. 7 during a heel strike stage according to the present disclosure.

FIG. 8 is another block diagram of the exemplary hydraulic system 3000 illustrating the hydraulic system 3000 during a heel strike stage. As shown in FIG. 8, when the heel strike the ground, the force $F_f$ may be applied on the elastic chamber 400 trying to reduce its volume. The pressure P1 in the chamber 400 may increase, causing the valve 430 to be pushed open by the fluid in the chamber 400 and the fluid in the chamber 400 may quickly rush to the camber 600 through the T-connector 670. Consequently, the pressure P3 in the chamber 600 may increase, as well as pressure in the passages 330 and 340. The nozzles 320 and 350 may form jets that rotate the turbine 310 in a counterclockwise direction and thus, rotate the generator 300. The fluid from turbine outlet S may drain to the chamber 500 through the passage 370 and push open the valve 540. The fluid flow direction may be indicated by arrows in the passages as shown in FIG. 8. Because the fluid may be flowing into the chamber 500, the pressure P2 and the volume of the chamber 500 may also increase.

Figure 9:
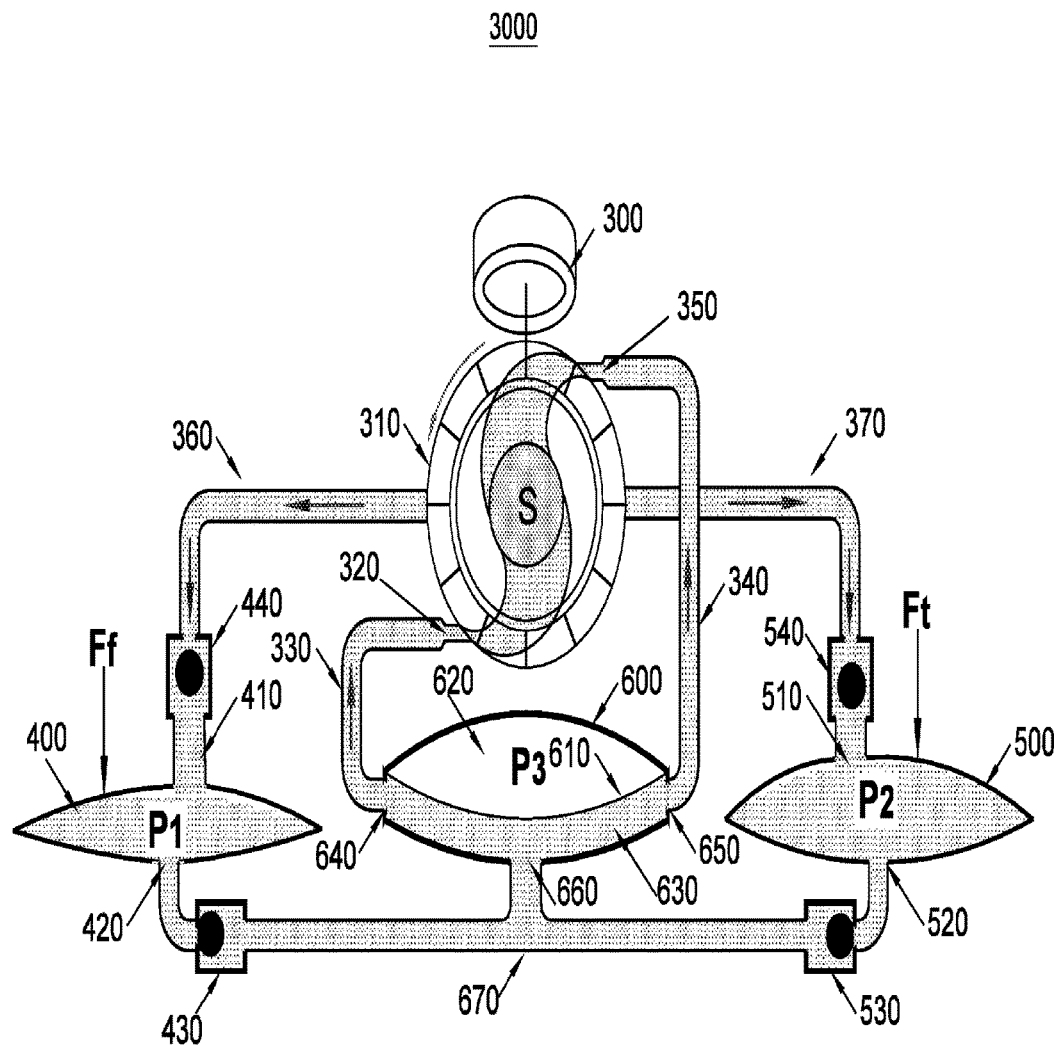
FIG. 9 is another block diagram of the exemplary hydraulic system of FIG. 7 during a flatfoot stage according to the present disclosure.

When the force $F_f$ starts to decrease (e.g., at the end of the heel strike stage), the pressure P1 may decrease, and when the pressure P1 becomes less than the pressure P3 the valve 430 may be closed as shown in FIG. 9, which is another block diagram of the exemplary hydraulic system 3000 illustrating a flatfoot stage. During the flatfoot stage, the force $F_f$ applied to the chamber 400 may be equal to a force Ft (e.g., a force generated by pressing the toe to the ground) applied to the chamber 500, and the pressures P1 and P2 may be about the same and lower than during the heel strike stage. Further, during the flatfoot stage, the fluid may continue to flow from the chamber 600 to the turbine 310 since the pressure P3 may be greater than the pressures P1 and P2. As shown in FIG. 9, the fluid from the outlet S of the turbine 310 may split in two parts: a first part may flow to the chamber 400 through the passage 360 and valve 440, and a second part may flow to the chamber 500 through the passage 370 and valve 540. During the flatfoot stage, the turbine 310 may continue to rotate the generator 300. The fluid flow direction may be indicated by arrows in the passages as shown in FIG. 9.

Figure 10:
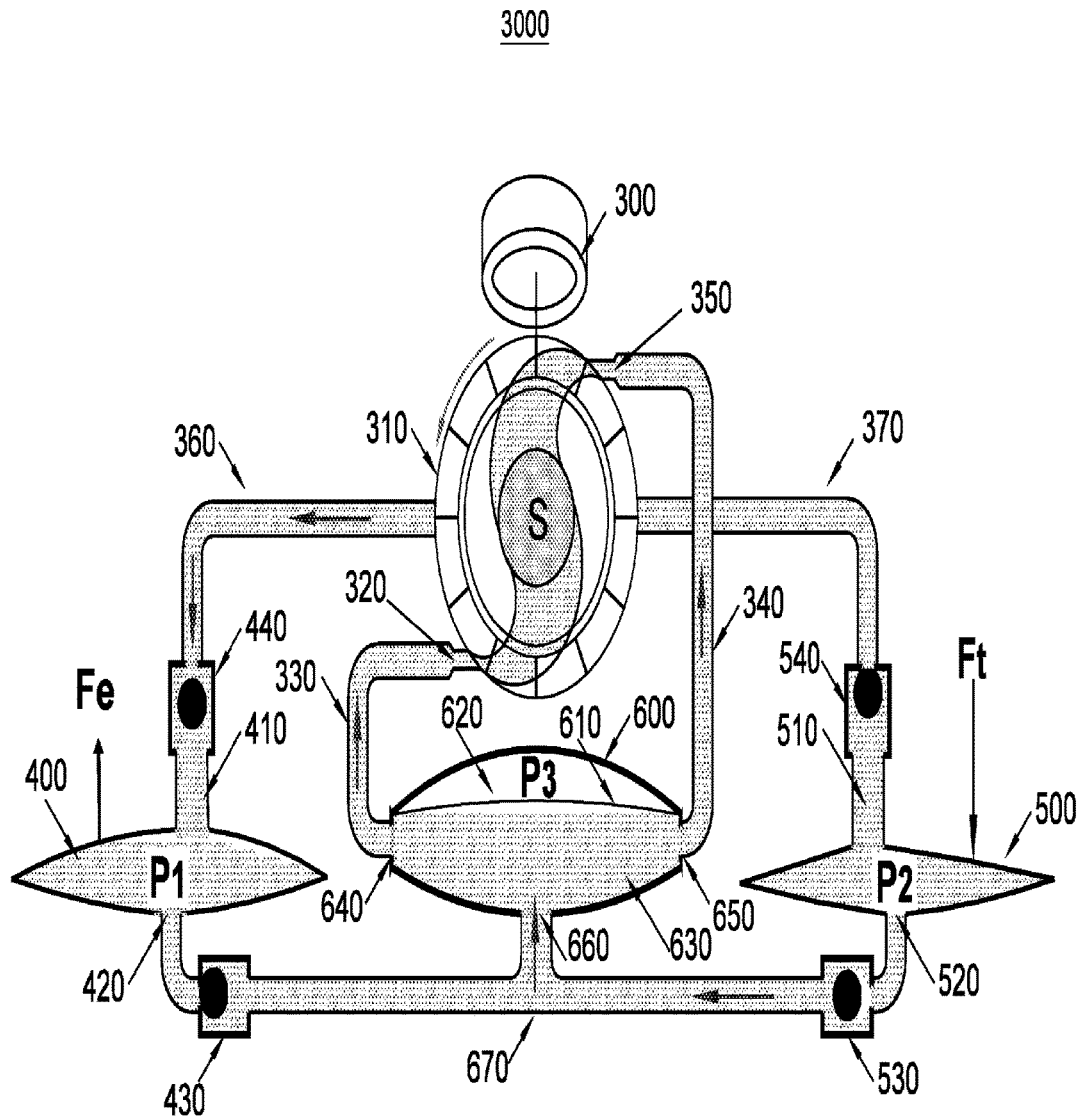
FIG. 10 is another block diagram of the exemplary hydraulic system of FIG. 7 during a heel rise and toe off stage according to the present disclosure.

FIG. 10 is another block diagram of the exemplary hydraulic system 3000 illustrating a heel rise and toe off stage. At the heel rise and toe off stage, as shown in FIG. 10, only the force $F_t$ may be applied to the chamber 500. The pressure P2 in the chamber 500 may increase and the pressure P1 in the chamber 400 may decrease. The elastic force Fe of the chamber 400's cover may contribute to the pressure drop in the chamber 400. The pressure difference between the chambers 500 and 400 may cause the fluid in the chamber 500 to push close the valve 540 and push open the valve 530. The pressure in the T-connector 670 may push close the valve 430 in the direction to the chamber 400. The fluid may quickly rush into the chamber 600 and the pressure P3 may increase. Consequently, the jet speed from the nozzles 320 and 350 may become greater, as well as rotation speed of the turbine 310. Under the differential pressure between the chambers, the fluid may flow from the outlet S of the turbine 310 into the chamber 400 via the valve 440.

Figure 11:
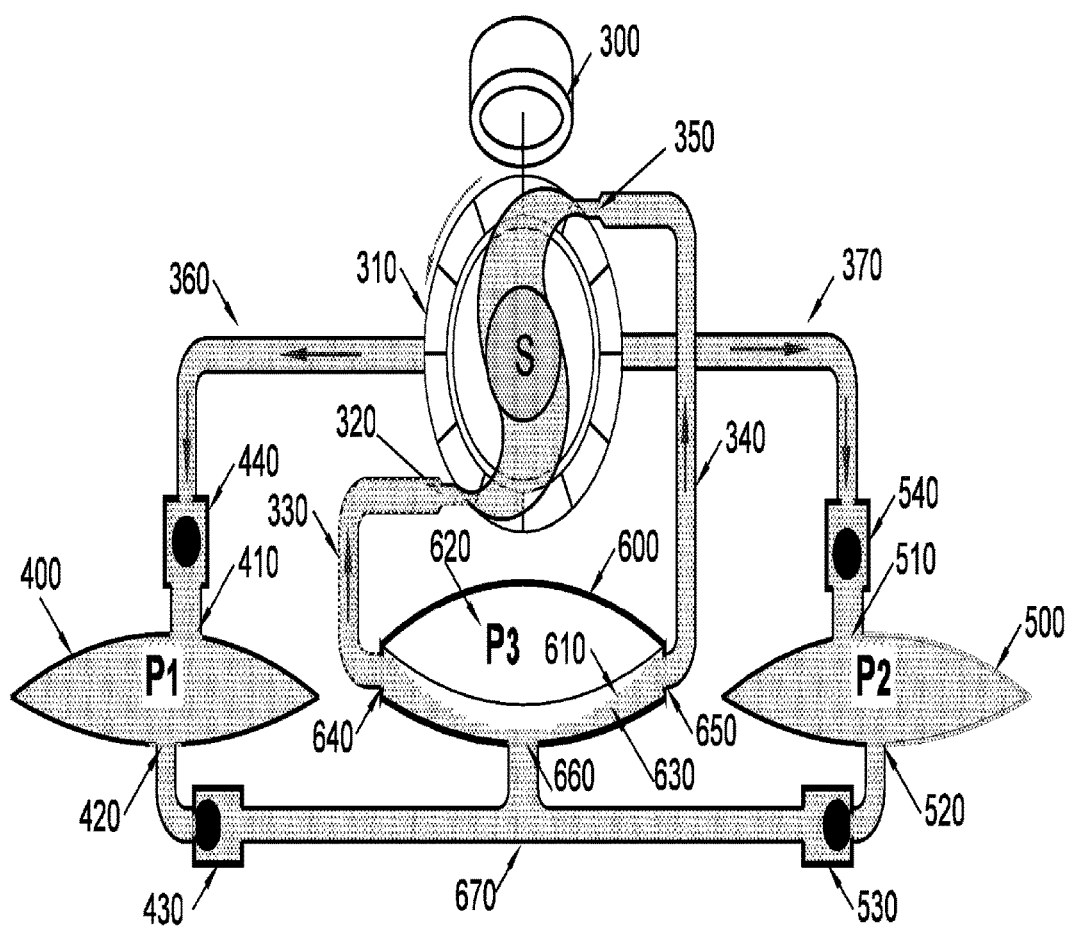
FIG. 11 is another block diagram of the exemplary hydraulic system of FIG. 7 during a swing phase according to the present disclosure.

FIG. 11 is yet another block diagram of the exemplary hydraulic system 3000 illustrating a swing phase. When the swing phase begins, the force $F_t$ may disappear and the pressure P2 in the chamber 500 may decrease. The valve 530 may become closed and the valve 540 may be opened. The fluid stored in the chamber 600 may continue to flow to the turbine 310 and rotates it. The fluid may then flow from the turbine outlet S into the chambers 400 and 500 until the pressures P3 and P2 in the chambers 500 and 400 become equal.

In certain embodiments, the flexible volume chambers may be made completely of elastic material and placed between two surfaces, in which one or both surfaces may be movable respective to the shoe body and may squeeze the chambers during the HS and/or HR and TO stages, respectively. The energy storing chamber may be made completely of high stress elastic material, which may change its volume slightly under pressure, but the rigidity of which may be greater than the rigidity of the flexible volume chambers.

The hydraulic systems 1000, 2000 and 3000 may combine gas-filled cushioning with harvesting electrical power generated by a turbine from the energy of impact (e.g., the foot striking the ground). As described above, in certain embodiments, at least one elastic chamber may be placed under the heel area (e.g., chamber 100, chamber 400). In the beginning of a heel strike stage, the elastic chamber placed under the heel area may be compressed fast and greatly reduce heel stress, which usually has the greatest impact on the human joints.

In one embodiment, if the displacement volume may be 15 $cm^3$ in each chamber and a heel compression of 4 mm is assumed, the top surface area required for the chambers may be 37.5 $cm^2$, which may easily fit in the heel of size 8 shoes. Moreover, if the fluid used to push the turbine is water and the efficiency of the turbine is 0.5, then an energy output of about 1 J at each step may be achieved when the water speed on the turbine is about 12 m/s.

Figure 12A:
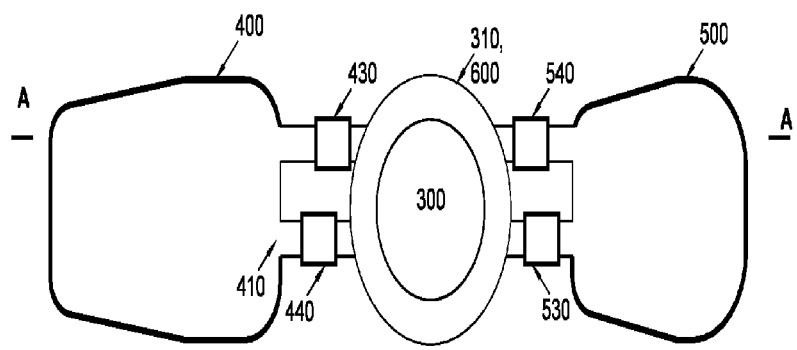
FIG. 12A is a top (or bottom) view of an exemplary hydraulic system for a footwear according to the present disclosure.
Figure 12A:
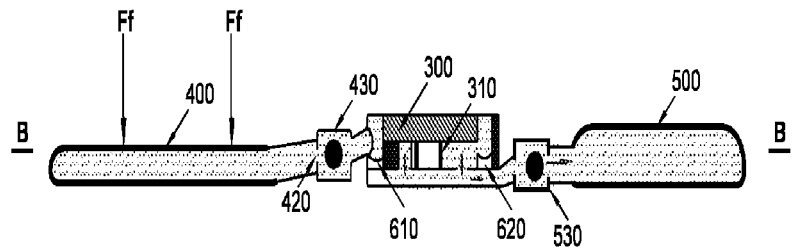
Figure 12A:
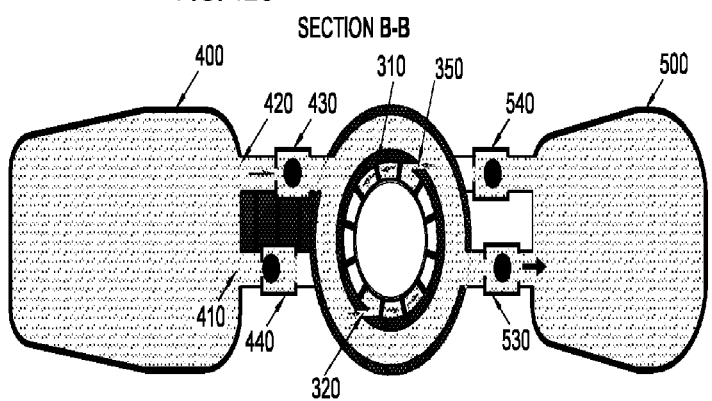

FIG. 12A is a top (or bottom) view of the exemplary hydraulic system 3000. FIG. 12B is a cross sectional view of the exemplary hydraulic system 3000 during a HS stage along the A-A line of FIG. 12A. FIG. 12C is another cross sectional view of the exemplary hydraulic system 3000 during a HS stage along the B-B line of FIG. 12B. As described above, the chamber 400 may be placed in the heel area of a shoe sole, the chamber 500 may be place in the ball of foot area of a shoe sole. Further, the chamber 600, turbine 310 and generator 300 may be stacked together and placed under the foot arch in the shoe sole. It should be noted that the particular order of how the chamber 600, turbine 310 and generator 300 are stacked may be different in different embodiments. That is why FIG. 12A may be a top view for one embodiment and a bottom view for a different embodiment depending on which of the chamber 600, turbine 310 and generator 300 may be stacked at the top or bottom. The generator 300 and turbine 310 may be coin-shaped to fit in the small space under foot arch.

While specific embodiments and applications of the present invention have been illustrated and described, it is to be understood that the invention is not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the present invention disclosed herein without departing from the spirit and scope of the invention. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

What is claimed is:

1. A hydraulic system for a footwear, comprising:
a first variable volume chamber having an elastic cover that deforms when pressed and an elastic membrane that divides the first variable volume chamber into a first and second compartments, wherein the first compartment is filled with gas and the second compartment is filled with liquid;
a generator having a turbine; and
a first passage to fluidly couple the second compartment to the turbine, wherein the liquid of the second compartment flows to turn the turbine when the first variable volume chamber is pressed.

2. The hydraulic system of claim 1, wherein the gas in the first compartment provides impact cushion for the footwear and transient energy storage when pressured.

3. The hydraulic system of claim 2, wherein the gas in the first compartment is pre-pressurized to improve cushioning.

4. The hydraulic system of claim 1, wherein the elastic cover is capable of restoring shape when pressure is removed.

5. The hydraulic system of claim 4, wherein pressure to push the liquid within the second compartment to flow out of the second compartment and turn the turbine is generated by pressing the elastic cover.

6. The hydraulic system of claim 1, wherein the first variable volume chamber is located at a heel section of the footwear.

7. The hydraulic system of claim 1, further comprising a second passage and a second chamber, the second passage fluidly couples the second chamber to the turbine and the second chamber is configured to act as a reservoir for the fluid liquid.

8. The hydraulic system of claim 7, wherein the second chamber is located in a ball section of the footwear.

9. The hydraulic system of claim 1, further comprising a second chamber having a second elastic membrane dividing the second chamber into a third and fourth compartments.

10. The hydraulic system of claim 9, wherein the third compartment is filled with gas, and the fourth compartment is filled with liquid.

11. The hydraulic system of claim 10, further comprising a second passage to fluidly couple the fourth compartment to the turbine.

12. The hydraulic system of claim 11, wherein the liquid of the second compartment flows to the fourth compartment and turns the turbine when the elastic cover of the first variable volume chamber is pressed and wherein the liquid of the fourth compartment flows to the second compartment and turns the turbine when the elastic cover of the second chamber is pressed.

13. The hydraulic system of claim 12, wherein the first passage has a first nozzle to eject the liquid to the turbine when the elastic cover of the first variable volume chamber is pressed.

14. The hydraulic system of claim 13, wherein the second passage has a second nozzle to eject the liquid to the turbine when the elastic cover of the second chamber is pressed.

15. The hydraulic system of claim 14, wherein the turbine has a drain that drains the liquid into a first opening on the second passage when the fluid liquid is flowing from the first variable volume chamber to the second chamber and drains the fluid liquid into a second opening on the first passage when the fluid liquid is flowing from the second chamber to the first variable volume chamber.

16. The hydraulic system of claim 15, wherein the first and second openings each has a check valve that blocks the first and second openings when the liquid in the respective passage is flowing toward the turbine.

* * * * *